(12) United States Patent
Oh et al.

(10) Patent No.: US 11,450,943 B2
(45) Date of Patent: Sep. 20, 2022

(54) TIERED CHASSIS WITH ANTENNA CAVITY

(71) Applicant: HEWLETT-PACKARD DEVELOPMENT COMPANY, L.P., Spring, TX (US)

(72) Inventors: Sung Oh, San Jose, CA (US); Philip Wright, Ottawa (CA)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/761,021

(22) PCT Filed: Jan. 25, 2018

(86) PCT No.: PCT/US2018/015186
§ 371 (c)(1),
(2) Date: May 1, 2020

(87) PCT Pub. No.: WO2019/147241
PCT Pub. Date: Aug. 1, 2019

(65) Prior Publication Data
US 2020/0381801 A1    Dec. 3, 2020

(51) Int. Cl.
*H01Q 1/22* (2006.01)
*G06F 1/16* (2006.01)
*H01Q 1/42* (2006.01)
*H01Q 1/48* (2006.01)
*H04B 7/0413* (2017.01)

(52) U.S. Cl.
CPC ......... *H01Q 1/2266* (2013.01); *G06F 1/1669* (2013.01); *G06F 1/1681* (2013.01); *H01Q 1/42* (2013.01); *H01Q 1/48* (2013.01); *H04B 7/0413* (2013.01)

(58) Field of Classification Search
CPC .............................. H01Q 1/2266; H01Q 5/378
See application file for complete search history.

(56) References Cited

U.S. PATENT DOCUMENTS

| 9,496,932 | B1 | 11/2016 | Prendergast et al. | |
| 9,935,357 | B2* | 4/2018 | Bologna | H01Q 1/2291 |
| 2002/0190905 | A1* | 12/2002 | Flint | H01Q 1/44 |
| | | | | 343/702 |
| 2008/0278398 | A1* | 11/2008 | Tsai | H01Q 1/2266 |
| | | | | 343/850 |
| 2010/0120379 | A1 | 5/2010 | Fukagawa et al. | |
| 2010/0321255 | A1 | 12/2010 | Kough | |
| 2013/0321216 | A1* | 12/2013 | Jervis | H04M 1/0216 |
| | | | | 343/702 |

(Continued)

FOREIGN PATENT DOCUMENTS

| CN | 103457019 | 12/2013 |
| CN | 104733861 | 6/2015 |

(Continued)

*Primary Examiner* — Andrea Lindgren Baltzell
(74) *Attorney, Agent, or Firm* — HPI Patent Department

(57) ABSTRACT

An example device may comprise a metallic chassis having a tiered surface comprising an upper face, a connecting face, and a lower face. The connecting face may be arranged between the upper face and the lower face such that the upper face and the connecting face define a raised area. The device may also comprise an antenna cavity formed in the raised area and having an opening in the upper face and the connecting face.

13 Claims, 2 Drawing Sheets

(56) References Cited

U.S. PATENT DOCUMENTS

| | | | |
|---|---|---|---|
| 2014/0009355 A1 | 1/2014 | Samardzija | |
| 2014/0306850 A1* | 10/2014 | Enomoto | H01Q 1/24 |
| | | | 343/702 |
| 2015/0022402 A1 | 1/2015 | Gavilan et al. | |
| 2015/0200443 A1 | 7/2015 | Lo | |
| 2017/0117608 A1 | 4/2017 | Bologna | |
| 2020/0136230 A1* | 4/2020 | Hung | H01Q 1/48 |
| 2021/0175606 A1* | 6/2021 | Ramasamy | H01Q 1/2266 |

FOREIGN PATENT DOCUMENTS

| | | | |
|---|---|---|---|
| CN | 104836023 | | 8/2015 |
| JP | 2011-4263 A | | 1/2011 |
| JP | 2011004263 A | * | 1/2011 |
| JP | 2015-18524 A | | 1/2015 |
| TW | 200919830 A | | 5/2009 |
| WO | WO-2017061869 | | 4/2017 |

* cited by examiner

TIERED CHASSIS WITH ANTENNA CAVITY

BACKGROUND

At times, devices, such as computing devices, may transmit and/or receive signals wirelessly. Antennas may be used in conjunction with transceivers to enable transmission and reception of signals.

BRIEF DESCRIPTION OF THE DRAWINGS

Various examples will be described below by referring to the following figures.

Figure 1:
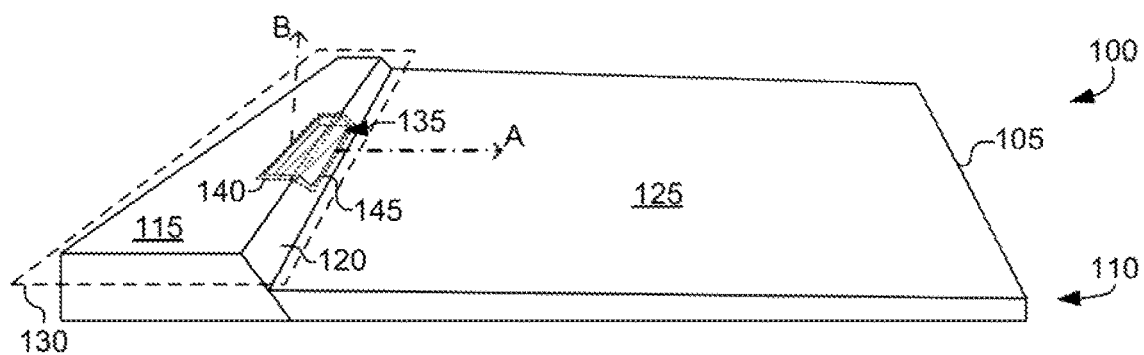
FIG. 1 is an illustration of an example device with a tiered surface.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

Devices, such as computing devices, may be able to exchange signals with other devices using wireless (e.g., radio frequency (RF) transmission mechanisms and methods. For example, a notebook computer may have wireless transmitters and receivers (e.g., transceivers) that may enable use of some wireless signal protocols, such as consistent with IEEE 802.11 standards. An example computing device may have WIFI or BLUETOOTH transceivers capable of transmitting and receiving data packets, by way of illustration. In addition to WIFI and BLUETOOTH, other example wireless transmission protocols may include Long Term Evolution (LTE), 60 GHz protocols (e.g., WIRELESSHD, WIGIG, etc.), and wireless home automation/internet-of-things protocols (e.g., Z-WAVE, ZIGBEE, etc.), without limitation.

Some materials, such as some metals (e.g., aluminum, copper, etc.), may impede transmission and/or reception of wireless signals (e.g., RF signals). For example, some metals may shield wireless transceivers from incoming wireless signals, and block transmission of wireless signals from wireless transceivers of a device to external devices. As should be appreciated, therefore, for computing devices with a metal chassis (or other wireless signal impeding structures and/or materials) there may be an interest in arranging chassis elements, wireless transceivers, and antennas to provide a clear wireless transmission path, or a transmission path that is unobscured by structural elements.

Nevertheless, as devices become thinner, limited device thickness may present challenges for arranging antennas to provide a clear wireless transmission path in a device with a metal chassis (or having metal chassis elements, by way of example). There may be an interest, therefore, in cases of thin profile device chassis, of arranging wireless antennas and transceivers to provide a clear wireless transmission path, such as to provide suitable signal strength.

One approach for providing suitable signal strength and a clear wireless transmission path may comprise using a tiered chassis structure having an upper portion and a lower portion, the upper portion having a first plane, the lower portion having a second plane lower than the first plane. The tiered chassis structure may have a connecting face connecting the upper and lower planes (e.g., intersecting the upper and lower planes). In one implementation, therefore, an antenna cavity may be formed in the upper portion of the tiered chassis to have an opening in the upper plane and the connecting face. Different device implementations capable of providing a clear wireless transmission path in devices having a thin profile chassis with elements, such as metal elements, capable of impeding wireless signal transmission and reception will be discussed hereinafter in relation to FIGS. 1-3

FIG. 1 illustrates an example device 100 having an arrangement of components to enable transmission and reception of wireless signals, such as via a clear wireless transmission path. Device 100 may comprise a metal chassis 105. For example, surfaces of chassis 105, such as upper face 115 and lower face 125, may comprise materials that may impede wireless (e.g., RF transmission). Such materials may include a metal (e.g., aluminum) or a metalloid, by way of example. In the implementation of device 100 shown in FIG. 1, a clear wireless transmission path may be made possible, at least in part, due to the tiered surface 110 of device 100 comprising an upper face 115, a lower face 125, and connecting face 120.

As used herein, a tiered surface refers to a surface of a device comprising two (or more) levels of different heights (e.g., tiers). Taking example device 100 to illustrate, a raised area 130 (shown with a broken line) may have an upper face 115 of a different level or height than a lower face 125. To be clear, surfaces of a tiered surface, such as tiered surface 110, may not necessarily be planar. For example, in one implementation, upper face 115 may comprise a curve. However, a tiered surface may be such that a connecting face 120 joins surfaces of different levels or heights. As such, a tiered surface may also be thought of in terms of distinct planes or levels. For instance, in one portion of metal chassis 105, an upper plane (e.g., coplanar with upper face 115) may be higher with respect to a lower plane (e.g., coplanar with lower face 125). And an intersecting plane (e.g., coplanar with connecting face 120) may intersect the upper and lower planes.

Figure 3:
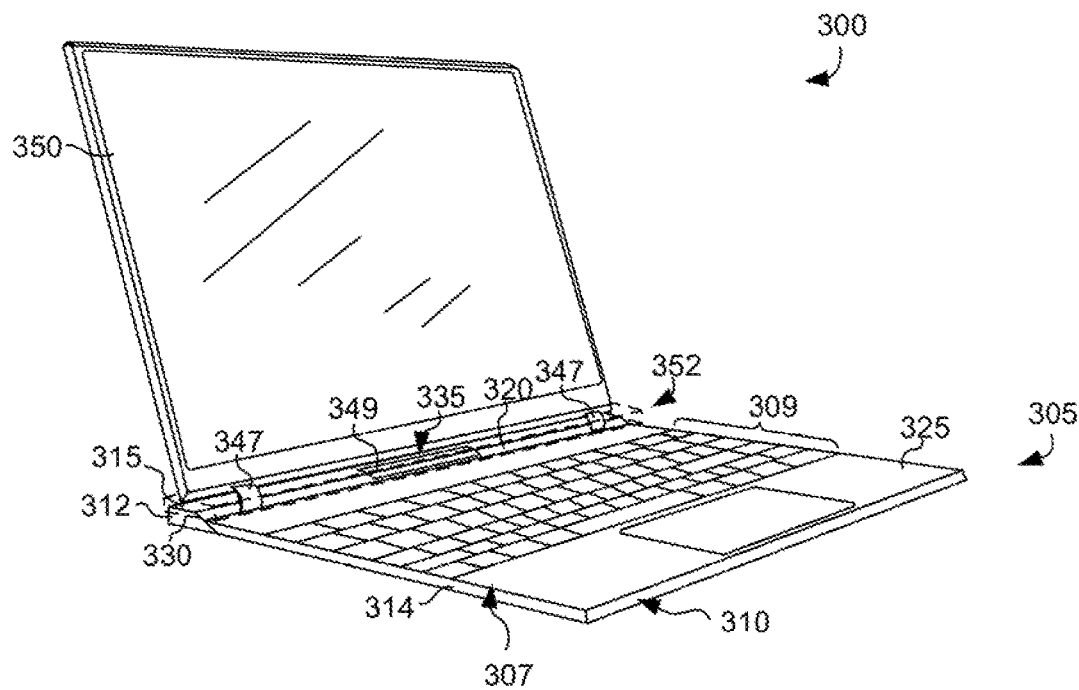
FIG. 3 is an illustration of an example device with a tiered chassis.

In implementations of notebook computing devices, raised area 130 may comprise a hinge area (not shown; see hinge area 352 in FIG. 3) capable of receiving a hinging mechanism (not shown; see hinging mechanism 347 in FIG. 3). Lower face 125 may be part of a lower tier of tiered surface 110 and may have a keyboard arranged therein (see, e.g., keyboard area 309 in FIG. 3). In other implementations, a display may be arranged in the lower tier of tiered surface 110.

With the foregoing in mind, a clear wireless transmission path may be achieved by arranging an antenna cavity 135 in raised area 130 of example device 100. For example, antenna cavity 135 may be formed in raised area 130 to have an opening 140 (shown with dotted lines and a translucent pattern fill merely for illustration) in upper face 115 and an opening 145 (also with dotted lines and a pattern fill) in connecting face 120. Inner surfaces of antenna cavity 135 may comprise a material similar to upper face 115 and connecting face 120, such as a metal. As such, if an antenna (not shown) is arranged within antenna cavity 135, wireless signals may transmit (and be received) over a range approximately parallel to lower face 125 and approximately perpendicular to upper face 115 (along a back surface of antenna cavity 135), as shown by dot-dash arrows A and B.

With the foregoing in mind, an example device (e.g., device 100) having a metallic chassis (e.g., metal chassis 105) with a tiered surface (e.g., tiered surface 110) may have a clear wireless transmission path. The tiered surface may have an upper face (e.g., upper face 115), a connecting face (e.g., connecting face 120), and a lower face (e.g., lower face 125). In one implementation, the connecting face may be arranged between the upper face and the lower face, and the upper face and the connecting face may define a raised area (e.g., raised area 130). An antenna cavity (e.g., antenna cavity 135) may be formed in the raised area and have an opening in the upper face and the connecting face.

As noted above, in one implementation of an example device (e.g., device 100), the upper face (e.g., upper face 115) of the raised area (e.g., raised area 130) and the connecting face (e.g., connecting face 120) may comprise metal. For example, in one case, the upper face and/or the connecting face may comprise aluminum or an aluminum alloy, magnesium or a magnesium alloy, etc.

In operation, example device 100 may function in a number of ways depending, for instance, on particular implementations thereof. For example, in an implementation in which device 100 is a notebook computing device, a keyboard may be arranged in a lower are (e.g., comprising lower face 125) of device 100. And a display portion may be connected to raised area 130 via a hinging mechanism (not shown; see FIG. 3). The display portion may be placed in a closed position in which the hinging mechanism moves to arrange the display portion in the space above lower face 125. In one case, a rear surface of the display portion may align with upper face 115 to form a substantially uniform surface while in the closed position. In contrast, in an open position, the hinging mechanism may move to arrange the display portion in a vertical position with respect to chassis 105, such as to provide a clear wireless transmission path to and from an antenna arranged in antenna cavity 135, such as illustrated by arrows A and B.

In another implementation, example device 100 may comprise a notebook computing device with a display portion arranged in a lower area (e.g., comprising lower face 125) of device 100. A keyboard portion may be connected to raised area 130 via a hinging mechanism. While in the foregoing implementation chassis 105 may remain substantially horizontal in an open position, in this implementation, the hinging mechanism may allow chassis 105 to move to a vertical position (such as to enable viewing of the display portion). The keyboard portion may move to a substantially horizontal position while in an open position in this implementation, such as to enable interaction with the keyboard portion in a convenient manner. Thus, in a closed position, the keyboard portion may be arranged in the space above lower face 125 (which may comprise a display portion in this example). A back surface of the keyboard portion may form a substantially uniform surface with upper face 115. And while in a closed position, the keyboard portion may be substantially perpendicular to chassis 105, such as to provide a clear wireless transmission path to and from an antenna arranged in antenna cavity 135, such as illustrated by arrows A and B.

It is noted that FIG. 1 (and some subsequent figures) includes markings, such as dotted lines, arrows, and pattern-filled shapes merely to facilitate explanation. Such markings are therefore not to be taken in a limiting sense.

Figure 2:
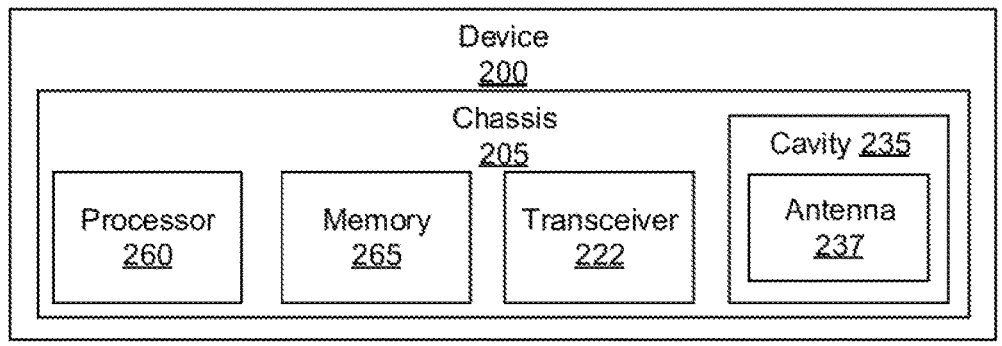
FIG. 2 is a block diagram of an example device with a transceiver and an antenna arranged in a cavity.

FIG. 2 is a block diagram of an example device 200 having a number of components that may be relevant to the discussion of transmission and reception of wireless signals. Device 200 may comprise a metal chassis 205, a display portion (not shown) arranged in one part of metal chassis 205, a keyboard portion (not shown) arranged in another part of metal chassis 205. The display and keyboard portions may be attached to each other using a hinging mechanism attached to a portion of metal chassis 205.

FIG. 2 shows example device 200 having a chassis 205 with a cavity 235 in which an antenna 237 may be arranged. Antenna 237 may comprise a multiple-input/multiple-output (MIMO) antenna (e.g., a 2×2 MIMO antenna) having a structure comprising a ground and feed loop and a parasitic leg (as shall be discussed hereinafter). Antenna 237 may be in communication (e.g., electrical, optical, wireless, etc.) with a transceiver 222. Signals, such as signals encoding data, may be transmitted between antenna 237 and transceiver 222. Signals may also be transmitted between transceiver 222 and processor 260. Signals transmitted from and received by transceiver 222 may be managed by processor 260, such as in response to execution of instructions stored (e.g., as signals or states) in memory 265. For example, in response to execution of instructions by processor 260, signals may be transmitted by transceiver 222 and antenna 237. And in response to execution of instructions by processor 260, signals may be received by transceiver 222 via antenna 237. Processor 260 refers to a general or special purpose processor capable of interpreting and executing instructions and logic. Memory 265 refers to a form of volatile or non-volatile memory, such as RAM, flash memory, magnetic memory, or phase change memory, by way of non-limiting example.

With the foregoing in mind, in one implementation, a device (e.g., example device 200) may comprise a MIMO antenna (e.g., antenna 237) arranged in the antenna cavity (e.g., antenna cavity 235) of a metal chassis (e.g., chassis 205).

Moving on to FIG. 3, an implementation of an example device 300 is illustrated that may be capable of providing a clear transmission path. In this implementation, example device 300 comprises a notebook computing device comprising a chassis 305 having a tiered surface 310. In one tier, upper tier 312, a hinge area 352 is arranged. In a lower tier, lower tier 314, a keyboard area 309 is arranged. In this example, tiered surface 310 comprises an upper face 315, a connecting face 320, and a lower face 325. As should be apparent, upper face 315 is raised with respect to lower face 325.

In one case, chassis 305 may comprise a metal chassis. For example, upper face 315, connecting face 320, and/or lower face 325 may comprise a metal, such as aluminum or an aluminum alloy. Chassis 305 may comprise a display portion 350 and a keyboard chassis portion 307. In this example, keyboard chassis portion 307 may be have tiered surface 310 (e.g., similar to tiered surface 110 in FIG. 1) and keyboard area 309 may be arranged in lower tier 314 while hinging mechanism 347, which connects display portion 350 and keyboard chassis portion 307, may be arranged in upper tier 312.

Tiered surface 310 may allow display portion 350 to be arranged in a closed position within a space above lower face 325 of keyboard chassis portion 307. While in the closed position, a rear surface of display portion 350 may be arranged to be substantially coplanar with upper face 315. And display portion 350 may be moved into an open position, such as illustrated by the arrangement of device 300 in FIG. 3. In one implementation, the transition between open and closed positions may be enabled by hinging mechanisms 347 and hinge area 352. Hinge area 352 may correspond to a portion of raised area 330 (illustrated using broken lines to surround a portion of upper tier 312).

An antenna cavity 335 may be formed in raised area 330 (which may also correspond to a hinge area 352 in some implementations) of upper tier 312. Antenna cavity 335 may be such that a wireless transmission path may be provided through an opening in upper face 315 and an opening in connecting face 320. In FIG. 3, antenna cavity 335 is obscured by cover 349, which may comprise a material, such as a non-metal material including, but not limited to, a glass, a ceramic, or a plastic. As such, it may be that cover 349 does not obstruct a wireless transmission path to and from an antenna arranged within antenna cavity 335 (see, e.g., discussion of FIG. 1 and arrows A and B).

It is noted that other implementations are contemplated by claimed subject matter such as, for example, arranging the hinge area (e.g., hinge area 352) as part of the display portion (e.g., display portion 350) or in another portion of the chassis (e.g., chassis 305) to allow placement of an antenna cavity (e.g., antenna cavity 335) to have a wireless transmission path that is unobstructed by materials, such as metal materials, that can impede signal travel to and/or from antennas within the antenna cavity.

With the foregoing in mind, an example device (e.g., device 300) capable of providing a clear wireless transmission path is presented by way of illustration. Such an example device may comprise a tiered metallic chassis (e.g., chassis 305). As noted, the material of the chassis may impede wireless signal transmission. Thus, the chassis may comprise a tiered surface (e.g., tiered surface 310). The tiered metallic chassis may comprise a raised area (e.g., raised area 330) formed in an upper tier (e.g., upper tier 312) of the metallic chassis. The raised area may comprise an upper face (e.g., upper face 315) and a connecting face (e.g., connecting face 320). The tiered chassis may comprise a lower face (e.g., lower face 325), the lower face may be on a lower tier (e.g., lower tier 314), wherein the lower face is lower than the upper face and further wherein the connecting face is arranged between the upper face and the lower face. The chassis also may comprise an antenna cavity (e.g., antenna cavity 335) in the raised area and an opening in the upper face of the raised area and the connecting face of the raised area.

As discussed above, one example device (e.g., device 300) may be such that the raised area (e.g., raised area 330) comprises a metal or a metalloid.

An example device (e.g., device 300) may also comprise a display portion (e.g., display portion 350) connected to the tiered metallic chassis via a hinging mechanism (e.g., hinging mechanism 347). The hinging mechanism may enable the display portion to be arranged within a space defined above the lower tier and adjacent to the raised area.

One example device (e.g., example device 300) may comprise a non-metal cover (e.g., cover 349) arranged over the antenna cavity.

In operation, example device 300 may function similarly to example device 200 discussed above in relation to FIG. 2.

Figure 4A:
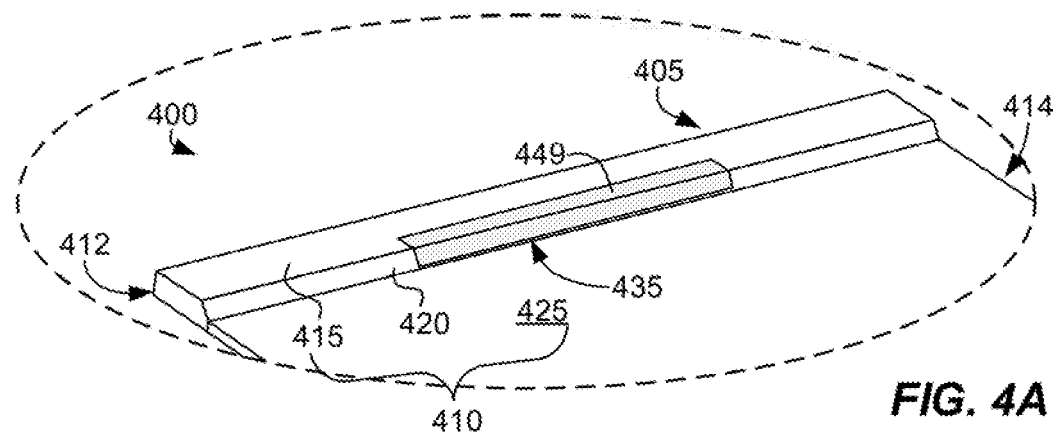
FIGS. 4A and 4B illustrate different example antenna cavity and cover implementations.
Figure 4B:
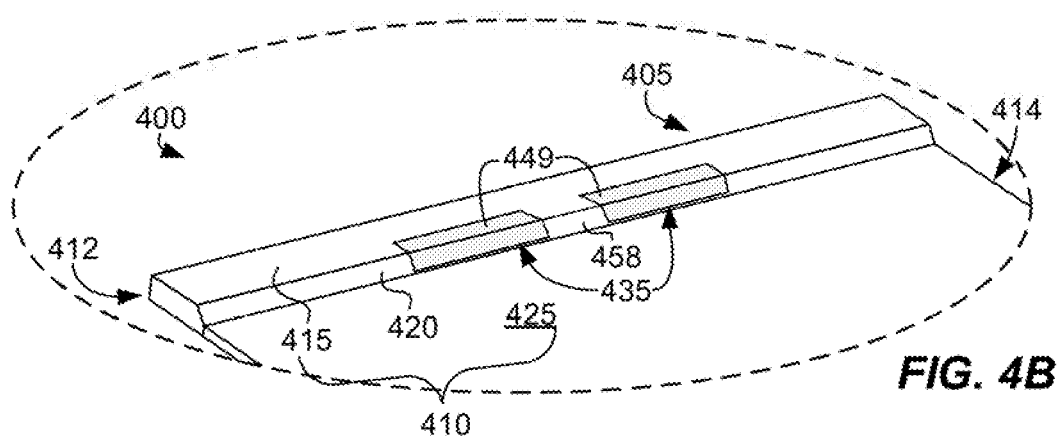

Turning to FIGS. 4A-4B, two implementations of a device 400 having a tiered surface are illustrated (e.g., a tiered surface of chassis 405). The implementation example device 400 in FIG. 4A comprises an antenna cavity 435 comprising a single cover 449. And the implementation of example device 400 in FIG. 4B comprises an antenna cavity 435 divided by partition 458 (e.g., comprising a same material as upper face 415) with covers 449 over both portions of antenna cavity 435 (or may be alternatively considered two separate antenna cavities 435, separated by partition 458).

Example device 400 of FIG. 4A may comprise a MIMO antenna, such as a 2×2 MIMO antenna, arranged under cover 449. For example, a feed and ground loop and a parasitic arm may be arranged under cover 449. One example thereof is discussed hereinafter with reference to FIG. 4C. Of course, other antenna forms and structures are contemplated by claimed subject matter (unless indicated otherwise).

As is discussed above, antenna cavity 435 may be arranged within an upper tier 412 such that antenna cavity 435 has a path through an opening in upper face 415 and connecting face 420. As shown, upper face 415, connecting face 420, and lower face 425 may form a tiered surface 410. In one case, a hinging area may be arranged in upper tier 412, such as to support a display portion (not shown). A keyboard area may be arranged in lower tier 414. In this case, a wireless transmission path may be created by placing the display portion in an open position.

Turning to FIG. 4B, example device 400 of FIG. 4B may comprise a MIMO antenna, such as a 2×2 MIMO antenna (of course, other arrangements are contemplated by claimed subject matter, such as 3×3 MIMO antennas, etc.), arranged within antenna cavity 435 (e.g., divided by partition 458, which may comprise a metal) under covers 449. For example, a feed and ground loop and a parasitic arm may be arranged under covers 449. As noted above, an example antenna structure is discussed hereinafter with reference to FIG. 4C. However, other antenna forms and structures are contemplated by claimed subject matter (unless indicated otherwise).

As is discussed above, antenna cavity 435 may be arranged within an upper tier 412 such that antenna cavity 435 has a path through an opening in upper face 415 and an opening in connecting face 420. As shown, upper face 415, connecting face 420, and lower face 425 may form a tiered surface 410. In one case, a hinging area may be arranged in upper tier 412, such as to support a display portion (not shown). A keyboard area may be arranged in lower tier 414. In this case, a wireless transmission path may be created by placing the display portion in an open position.

Figure 4C:
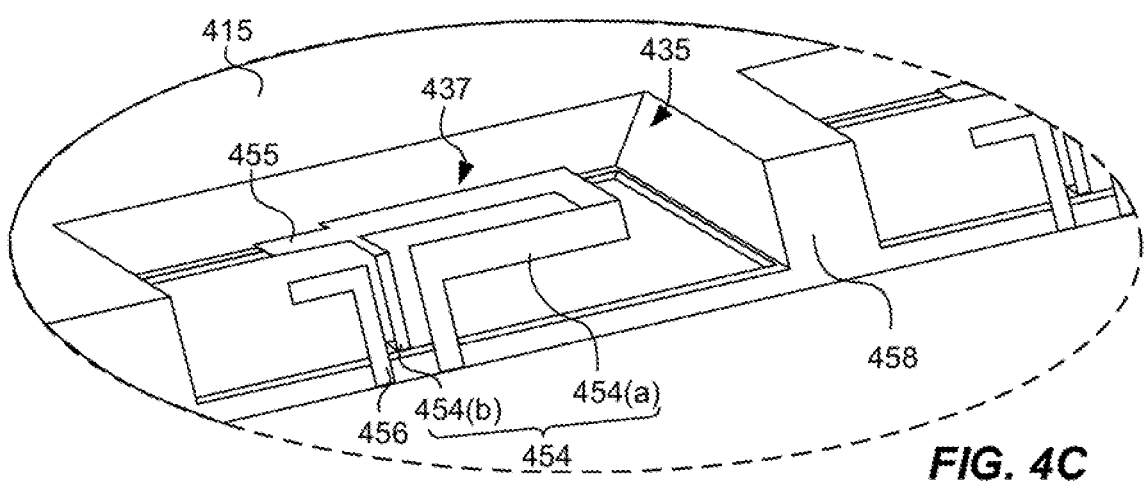
FIG. 4C illustrates an example antenna.

In FIG. 4C, an example antenna 437 (e.g., a HMO antenna as part of, for example, a 2×2 MIMO antenna) is illustrated within antenna cavity 435. A partition 458 may be arranged to separate cavity 435 into multiple portions. Partition 458 may comprise a metal, similar to upper face 415 in one case. Antenna 437 may comprise a feed and ground leg loop 454 with a ground leg 454(*a*) and a feed 454(*b*). Additionally, feed and ground leg loop 454 may comprise an extension 455, as shown. In one case, extension 455 may be directed toward parasitic arm 456, such as to form a capacitive coupling. Parasitic arm 456 capacitively coupled with feed 454(*b*) may enable transmission of relatively wide bandwidth wireless signals, such as 5 GHz of WIFI bandwidth in one implementation.

With the foregoing in mind, an example device will be discussed referring to FIGS. 3 and 4A-4C by way of illustration (and not limitation). Thus, an example hinged computing device (e.g., device 300 of FIG. 3) having a wireless transmission path (e.g., from an antenna cavity) may comprise a display portion (e.g., display portion 350 of FIG. 3) and a keyboard chassis portion (e.g., keyboard chassis portion 307) connected to the display portion via a hinging mechanism (e.g., hinging mechanism 347). The keyboard chassis portion may comprise a tiered surface (e.g., tiered surface 310 of FIG. 3 or tiered surface 410 of FIGS. 4A and 4B) and a hinge area (e.g., hinge area 352 of FIG. 3) may be formed in an upper tier (e.g., upper tier 312 of FIG. 3 and upper tier 412 of FIGS. 4A and 4B) and a keyboard area (e.g., keyboard area 309 of FIG. 3) in a lower tier (e.g., lower tier 314 of FIG. 3 and lower tier 414 of FIGS. 4A and 48). The hinge area may be connected to the hinging mechanism.

The example device may comprise two antenna cavities (e.g., antenna cavities 435 in FIG. 4B) in the hinge area with openings in an upper surface and a connecting surface of the hinge area (see, e.g., FIG. 1 and discussion of opening 140 in upper face 115 and opening 145 in connecting face 120). MIMO antennas (e.g., antenna 437 in FIG. 4C) may be arranged within the two antenna cavities and may comprise a feed (e.g., feed 454(b)), a ground leg (e.g., ground leg 454(a)), and a parasitic arm (e.g., parasitic arm 456) arranged in the two antenna cavities. A cover (e.g., cover 449 in FIG. 4B) may be arranged over the two antenna cavities. The cover may comprise a non-metallic cover. For example, the cover may comprise one of a glass, a ceramic, or a plastic.

As discussed in relation to FIG. 4C, a first MIMO antenna comprising a feed, a ground leg and a parasitic arm may be arranged in a first portion of the two portions of the antenna cavity (see, e.g. antenna cavity 435 in FIG. 4C), and a second MIMO antenna comprising a feed, a ground leg, and a parasitic arm in a second portion of the two portions of the antenna cavity (see, e.g., the partially obscured and unlabeled second antenna cavity of FIG. 4C to the right of partition 458).

In view of the foregoing discussion, it is noted that a device, such as a computing device, having a chassis with materials and/or a structure that may impede transmission of wireless signals may use a tiered surface and have an antenna cavity with an opening in an upper face of an upper tier and an opening in a connecting face of the upper tier. Such an arrangement of components may enable a wireless transmission path for an antenna arranged in the antenna cavity.

It is noted that though the foregoing discussion refers, at times, to directional arrangements (e.g., upper or lower; horizontal or vertical; etc.), these directional terms are provided merely to illustrate relationships between structural elements and/or function of example devices. Therefore, these directions are not to be taken in a limiting sense.

What is claimed is:

1. A device comprising:
 a metallic chassis having a tiered surface comprising an upper face, a connecting face, and a lower face, wherein:
  the upper face is a metallic material and the connecting face is a metallic material;
  the connecting face is arranged between the upper face and the lower face; and
  the upper face and the connecting face define a raised area;
 an antenna cavity formed in the raised area and having an opening in the upper face and the connecting face;
 an antenna positioned within the antenna cavity, wherein the antenna includes a feed and ground leg loop and an extension directed toward a parasitic arm to form capacitive coupling with the feed of the feed and ground leg loop; and
 a display portion, wherein:
  in response to the display portion being in an open position, a transmission path is created for the antenna; and
  in response to the display portion being in a closed position, the transmission path for the antenna is impeded by the metallic chassis.

2. The device of claim 1, wherein the upper face of the raised area and the connecting face are comprised of an aluminum alloy.

3. The device of claim 1, wherein the raised area is attached to the display portion via a hinging mechanism.

4. The device of claim 1, wherein the antenna is a multiple-input/multiple-output (MIMO) antenna.

5. The device of claim 4 further comprising a non-metal cover arranged over the antenna cavity.

6. A device comprising:
 a tiered metallic chassis comprising:
  a raised area formed in an upper tier of the metallic chassis, the raised area comprising an upper face and a connecting face, wherein the upper face is a metallic material and the connecting face is a metallic material;
  a lower face of the metallic chassis, the lower face on a lower tier, wherein the lower face is lower than the upper face of the raised area, and wherein the connecting face is arranged between the upper face and the lower face;
  an antenna cavity in the raised area having an opening in the upper face of the raised area and the connecting face of the raised area; and
  an antenna positioned within the antenna cavity, wherein the antenna includes a feed and ground leg loop and an extension directed toward a parasitic arm to form capacitive coupling with the feed of the feed and ground leg loop; and
 a display portion, wherein:
  in response to the display portion being in an open position, a transmission path is created for the antenna; and
  in response to the display portion being in a closed position, the transmission path for the antenna is impeded by the metallic chassis.

7. The device of claim 6, wherein the raised area is comprised of an aluminum alloy.

8. The device of claim 6, wherein the antenna cavity is divided into two portions by a metal partition.

9. The device of claim 6, comprising a non-metallic cover arranged to cover two portions of the antenna cavity.

10. The device of claim 6, wherein the display portion is connected to the tiered metallic chassis via a hinging mechanism, wherein the hinging mechanism enables the display portion to be arranged within a space defined above the lower tier and adjacent to the raised area.

11. A hinged computing device comprising:
 a display portion;
 a keyboard chassis portion connected to the display portion via a hinging mechanism, wherein the keyboard chassis portion comprises a tiered surface forming a hinge area in an upper tier and a keyboard area in a lower tier, the hinge area connected to the hinging mechanism;
 two antenna cavities in the hinge area with openings in an upper surface and a connecting surface of the hinge area, wherein the upper surface of the hinge area is a metallic material and the connecting surface is a metallic material;
 multiple-input/multiple-output (MIMO) antennas comprising a feed and ground leg loop and a parasitic arm arranged in the two antenna cavities and an extension directed toward the parasitic arm to form capacitive coupling with the feed of the feed and ground leg loop; and a cover arranged over the two antenna cavities;

wherein:

in response to the display portion being in an open position, transmission paths are created for the MIMO antennas; and in response to the display portion being in a closed position, the transmission paths for the MIMO antennas are impeded by a metallic chassis.

12. The hinged computing device of claim 11, wherein surfaces of the two antenna cavities comprise a metal or a metalloid.

13. The hinged computing device of claim 11 wherein the cover comprises a glass, a ceramic, or a plastic.

* * * * *